United States Patent
Al-Kanani et al.

(10) Patent No.: US 12,003,360 B2
(45) Date of Patent: Jun. 4, 2024

(54) OAM FUNCTIONAL SERVICE EXPOSURE AND DISCOVERY FUNCTION AND DATA REPOSITORY

(71) Applicant: NEC LABORATORIES EUROPE GMBH, Heidelberg (DE)

(72) Inventors: Hassan Al-Kanani, Iver (GB); Linghang Fan, Woking (GB); Iskren Ianev, Reading (GB)

(73) Assignee: NEC CORPORATION, Tokyo (JP)

( * ) Notice: Subject to any disclaimer, the term of this patent is extended or adjusted under 35 U.S.C. 154(b) by 284 days.

(21) Appl. No.: 17/255,459

(22) PCT Filed: Jun. 25, 2019

(86) PCT No.: PCT/EP2019/066884
§ 371 (c)(1),
(2) Date: Dec. 23, 2020

(87) PCT Pub. No.: WO2020/002359
PCT Pub. Date: Jan. 2, 2020

(65) Prior Publication Data
US 2021/0281468 A1    Sep. 9, 2021

(30) Foreign Application Priority Data

Jun. 25, 2018  (EP) ..................... 18179655

(51) Int. Cl.
*H04L 41/04*   (2022.01)
*H04L 41/0853*  (2022.01)
(Continued)

(52) U.S. Cl.
CPC .......... *H04L 41/04* (2013.01); *H04L 41/0853* (2013.01); *H04L 41/5058* (2013.01);
(Continued)

(58) Field of Classification Search
CPC . H04L 41/04; H04L 41/0853; H04L 41/5058; H04W 4/50; H04W 76/11; H04W 84/042
See application file for complete search history.

(56) References Cited

U.S. PATENT DOCUMENTS 6,044,403 A * 3/2000 Gerszberg ............. H04L 67/306
                                                        709/225
6,363,411 B1 * 3/2002 Dugan .................. H04M 15/90
                                                        709/202

(Continued)

FOREIGN PATENT DOCUMENTS

EP    3002907 A1    4/2016

OTHER PUBLICATIONS

U.S. Appl. No. 62/615,903, filed 2018.*
(Continued)

*Primary Examiner* — Dung B Huynh
(74) *Attorney, Agent, or Firm* — Leydig, Voit & Mayer, Ltd.

(57) ABSTRACT

A method performed by a node for an Operations, Administration and Management (OAM) system includes maintaining information relating to at least one service provided by at least one node of the OAM system. The information is provided to a management function coupled to the OAM system. In this regard, the node communicates with the management function for sharing the information.

17 Claims, 12 Drawing Sheets

(51) Int. Cl.
*H04L 41/50* (2022.01)
*H04W 4/50* (2018.01)
*H04W 76/11* (2018.01)
*H04W 84/04* (2009.01)

(52) U.S. Cl.
CPC .............. *H04W 4/50* (2018.02); *H04W 76/11* (2018.02); *H04W 84/042* (2013.01)

(56) References Cited

U.S. PATENT DOCUMENTS

| | | | | |
|---|---|---|---|---|
| 9,762,402 | B2* | 9/2017 | Batz | H04M 15/66 |
| 9,860,790 | B2* | 1/2018 | Khan | H04W 40/00 |
| 10,003,530 | B2* | 6/2018 | Zhang | H04L 67/561 |
| 10,834,220 | B2* | 11/2020 | Son | H04L 67/562 |
| 10,984,484 | B1* | 4/2021 | Nidecker | G06Q 10/063114 |
| 11,533,190 | B2* | 12/2022 | Ansari | H04L 63/02 |
| 11,855,856 | B1* | 12/2023 | Guduru | H04L 43/06 |
| 2009/0214221 | A1* | 8/2009 | Li | H04B 10/40 398/136 |
| 2013/0031234 | A1* | 1/2013 | Alfano | H04L 41/052 709/223 |
| 2013/0128749 | A1* | 5/2013 | Krzanowski | H04L 41/0213 370/241.1 |
| 2013/0225124 | A1* | 8/2013 | Yan | H04W 12/084 455/406 |
| 2014/0254466 | A1* | 9/2014 | Wurster | H04L 51/18 370/312 |
| 2014/0370879 | A1* | 12/2014 | Redding | H04M 3/42178 455/419 |
| 2015/0040189 | A1* | 2/2015 | Fujii | H04W 4/60 726/3 |
| 2015/0109938 | A1* | 4/2015 | Zhang | H04L 43/10 370/241.1 |
| 2016/0352838 | A1* | 12/2016 | Larkin | H04L 45/243 |
| 2017/0303259 | A1* | 10/2017 | Lee | H04W 28/16 |
| 2018/0088589 | A1* | 3/2018 | Hasegawa | G05D 1/0276 |
| 2018/0098245 | A1* | 4/2018 | Livanos | H04M 15/8027 |
| 2018/0159954 | A1* | 6/2018 | Lu | H04L 67/61 |
| 2018/0288576 | A1* | 10/2018 | Xu | H04W 4/06 |
| 2018/0317163 | A1* | 11/2018 | Lee | H04W 4/70 |
| 2019/0021010 | A1* | 1/2019 | Senarath | H04L 41/5051 |
| 2019/0029065 | A1* | 1/2019 | Park | H04W 48/02 |
| 2019/0068495 | A1* | 2/2019 | Jeuk | H04L 45/02 |
| 2019/0158408 | A1* | 5/2019 | Li | H04L 67/104 |
| 2019/0182875 | A1* | 6/2019 | Talebi Fard | H04W 76/11 |
| 2019/0191467 | A1* | 6/2019 | Dao | H04W 76/11 |
| 2019/0215125 | A1* | 7/2019 | Da Silva | H04L 5/0051 |
| 2019/0215724 | A1* | 7/2019 | Talebi Fard | H04W 48/16 |
| 2019/0223250 | A1* | 7/2019 | Dao | H04W 72/23 |
| 2019/0238425 | A1* | 8/2019 | Mladin | H04L 41/342 |
| 2019/0251241 | A1* | 8/2019 | Bykampadi | G06F 21/604 |
| 2019/0261260 | A1* | 8/2019 | Dao | H04W 36/0033 |
| 2019/0296976 | A1* | 9/2019 | Maes | H04L 41/0859 |
| 2019/0306251 | A1* | 10/2019 | Talebi Fard | H04W 76/10 |
| 2019/0313468 | A1* | 10/2019 | Talebi Fard | H04W 60/04 |
| 2019/0335392 | A1* | 10/2019 | Qiao | H04W 48/18 |
| 2019/0342219 | A1* | 11/2019 | Liu | H04L 43/20 |
| 2019/0364615 | A1* | 11/2019 | Das | H04L 65/1036 |
| 2019/0380031 | A1* | 12/2019 | Suthar | G06Q 20/40 |
| 2019/0394279 | A1* | 12/2019 | Dao | H04W 48/04 |
| 2020/0015158 | A1* | 1/2020 | So | H04W 48/18 |
| 2020/0045624 | A1* | 2/2020 | Shimojou | H04W 88/14 |
| 2020/0077356 | A1* | 3/2020 | Youn | H04W 68/02 |
| 2020/0119909 | A1* | 4/2020 | Zhang | H04L 63/0435 |
| 2020/0120580 | A1* | 4/2020 | Jin | H04W 48/02 |
| 2020/0145833 | A1* | 5/2020 | Thakolsri | H04W 24/02 |
| 2020/0195445 | A1* | 6/2020 | Zhang | H04L 9/3213 |
| 2020/0267214 | A1* | 8/2020 | Yang | H04L 67/1001 |
| 2020/0267530 | A1* | 8/2020 | Bartolomé Rodrigo | H04W 48/18 |
| 2020/0280836 | A1* | 9/2020 | Velev | H04W 76/19 |
| 2020/0305033 | A1* | 9/2020 | Keller | H04L 65/1016 |
| 2020/0329381 | A1* | 10/2020 | Chou | H04W 24/02 |
| 2020/0374358 | A1* | 11/2020 | Miklós | H04L 67/562 |
| 2020/0404471 | A1* | 12/2020 | Bartolomé Rodrigo | H04W 8/20 |
| 2020/0412607 | A1* | 12/2020 | Guan | H04L 41/40 |
| 2021/0044482 | A1* | 2/2021 | Katsalis | H04L 41/5009 |
| 2021/0092639 | A1* | 3/2021 | Larsson | H04W 28/08 |
| 2021/0235244 | A1* | 7/2021 | Bartolomé Rodrigo | H04W 8/18 |
| 2021/0281468 | A1* | 9/2021 | Al-Kanani | H04W 4/50 |
| 2021/0306875 | A1* | 9/2021 | Zhang | H04W 24/02 |
| 2021/0360741 | A1* | 11/2021 | Shimojou | H04W 24/08 |
| 2021/0368427 | A1* | 11/2021 | Rommer | H04W 48/16 |
| 2021/0377357 | A1* | 12/2021 | Yao | H04L 67/1087 |

OTHER PUBLICATIONS

3rd Generation Partnership Project (3GPP), "3rd Generation Partnership Project; Technical Specification Group and System Aspects; Management and orchestration of networks and network slicing; Management and orchestration architecture (Release 15)", 3GPP Draft; TS 28.533 v0.3.0, Mobile Competence Centre; 650, Route Des Lucioles; F-06921 Sophia-Antipolis Cedex; France, Jun. 5, 2018 (Jun. 5, 2018), XP051543537, pp. 6-17.

Intel, "Update the functional management architecture to include MDAF," 3GPP Draft; S5-184103 PCR 28.533 Update Functional Management Architecture to Include MDAF, 3rd Generation Partnership Project (3GPP), Mobile Competence Centre; 650, Route Des Lucioles; F-06921 Sophia-Antipolis Cedex, TSG SA WG5, Stockholm (Sweden); Jun. 26, 2018-Jun. 28, 2018 Jun. 18, 2018 (Jun. 18, 2018), XP051543693, pp. 1-2.

3rd Generation Partnership Project (3GPP), "3rd Generation Partnership Project; Technical Specification Group Services and System Aspects; Study on Architecture for Next Generation System (Release 14)", 3GPP Standard; Technical Report; 3GPP TR 23.799, Mobile Competence Centre; 650, Route Des Lucioles; F-06921 Sophia-Antipolis Cedex; France, vol. SA WG2, No. V14.0.0, Dec. 16, 2016 (Dec. 16, 2016), pp. 1-527, XP051295448.

3rd Generation Partnership Project (3GPP), "3rd Generation Partnership Project; Technical Specification Group Core Network and Terminals; 5G System—Phase 1; CT WG4 Aspects (Release 15)", 3GPP Standard; Technical Report; 3GPP TR 29.891, Mobile Competence Centre; 650, Route Des Lucioles; F-06921 Sophia-Antipolis Cedex; France, vol. CT WG4, No. V15.0.0, Dec. 21, 2017 (Dec. 21, 2017), pp. 1-146, XP051392077.

3rd Generation Partnership Project (3GPP), "3rd Generation Partnership Project; Technical Specification Group Services and System Aspects; System Architecture for the 5G System; Stage 2 (Release 15)", 3GPP Standard; Technical Specification; 3GPP TS 23.501, Mobile Competence Centre; 650, Route Des Lucioles; F-06921 Sophia-Antipolis Cedex; France, vol. SA WG2, No. V15.2.0, Jun. 19, 2018 (Jun. 19, 2018), pp. 1-217, XP051472860.

* cited by examiner

OAM FUNCTIONAL SERVICE EXPOSURE AND DISCOVERY FUNCTION AND DATA REPOSITORY

CROSS-REFERENCE TO PRIOR APPLICATIONS

This application is a U.S. National Phase Application under 35 U.S.C. § 371 of International Application No. PCT/EP2019/06684, filed on Jun. 25, 2019, and claims benefit to European Patent Application No. EP 18179655.8, filed on Jun. 25, 2018. The International Application was published in English on Jan. 2, 2020 as WO 2020/002359 under PCT Article 21(2).

FIELD

The present embodiments relate to a communication system. The embodiments have particular but not exclusive relevance to wireless communication systems and devices thereof operating according to the 3rd Generation Partnership Project (3GPP) standards or equivalents or derivatives thereof. The embodiments have particular, but not exclusive relevance to improvements to an Operations, Administration and Management (OAM) system for supporting a Service Based Management architecture comprising multiple Management Functions (MF) may have multiple consumers.

BACKGROUND

The 3GPP Working Groups are currently defining the 5G system, and the 3GPP TSG SA WG5 is specifying the telecom management system architecture and corresponding procedures for 5G system.

The huge advancements and complexity of communication systems along with the diversity of services and rising expectations from 5G system, raise the need for a revolutionary transformation to the way networks and services are managed and orchestrated.

To facilitate delivery of the 5G services to meet the requirements of different categories of customers and verticals, Network Slicing is also expected to be a primary and an integrated feature of the future generation networks. The introduction of network slicing is also expected to add further impacts and complexities on the Operations, Administration and Management (OAM) systems requiring number of management functionalities to operate and interwork together with an efficient exchange of data and notifications. To overcome the aforementioned challenges and in order to aim for an agile, fully automated and near zero touch network management and orchestration, some vital changes are required on the management model and architecture.

The 3GPP TSG SA WG5 has been working on OAM system specifications addressing future generation networks and 5G system needs with the development of a Service Based Management architecture model in Technical Specification (TS) 28.533 V0.3.0. The architecture already constitutes a multiple of new management functions including the followings (see FIG. 1 which shows an example of functional management architecture):

NFMF (Network Function Management Function) provides management services for one or more NF, and may consume some management services produced by other functional blocks. The NF provides some management services, for example NF performance management services, NF configuration management services and NF fault supervision services.

NSSMF (Network Slice Subnet Management Function) provides management services for one or more NSSI, and may consume some management services produced by other functional blocks.

NSMF (Network Slice Management Function) Provides management services for one or more NSI, and may consume some management services produced by other functional blocks.

CSMF (Customer Service Management Function) consumes management service(s) provided by the other functional blocks. This deployment example does not illustrate what management services the CSMF consumes.

The Service Based Management architecture specifications in TS 28.533 V0.3.0 also started to define general procedures for the interactions between a management service producer and a management service consumer within the 3GPP OAM management system as well as interaction with external management systems such as MANO and Transport Network Layer management entities. To provide efficient network management and overall service orchestration, Management Functions (MFs) within the OAM system are required to interact and interwork with entities outside the OAM system including 3rd party entities (e.g. application functions, data repositories, analytics functions, etc.).

As part of the currently being developed Service Based Management architecture a Management Service produced by a Management Function (MF) may have multiple consumers. The Management Function may consume multiple Management Services from one or multiple Management Service producers.

The 3GPP TSG SA WG5 has already defined a range of functional management entities as part of the Service Based Management Architecture TS 28.533 V0.3.0. The number of management functions and entities within the 3GPP OAM system is likely to increase even further along with the increased development on future generation networks and introduction of diversity of services leading to even more complex management and operational requirements.

SUMMARY

In an embodiment, the present invention provides a method performed by a node for an Operations, Administration and Management (OAM) system. The method includes maintaining information relating to at least one service provided by at least one node of the OAM system. The information is provided to a management function coupled to the OAM system.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
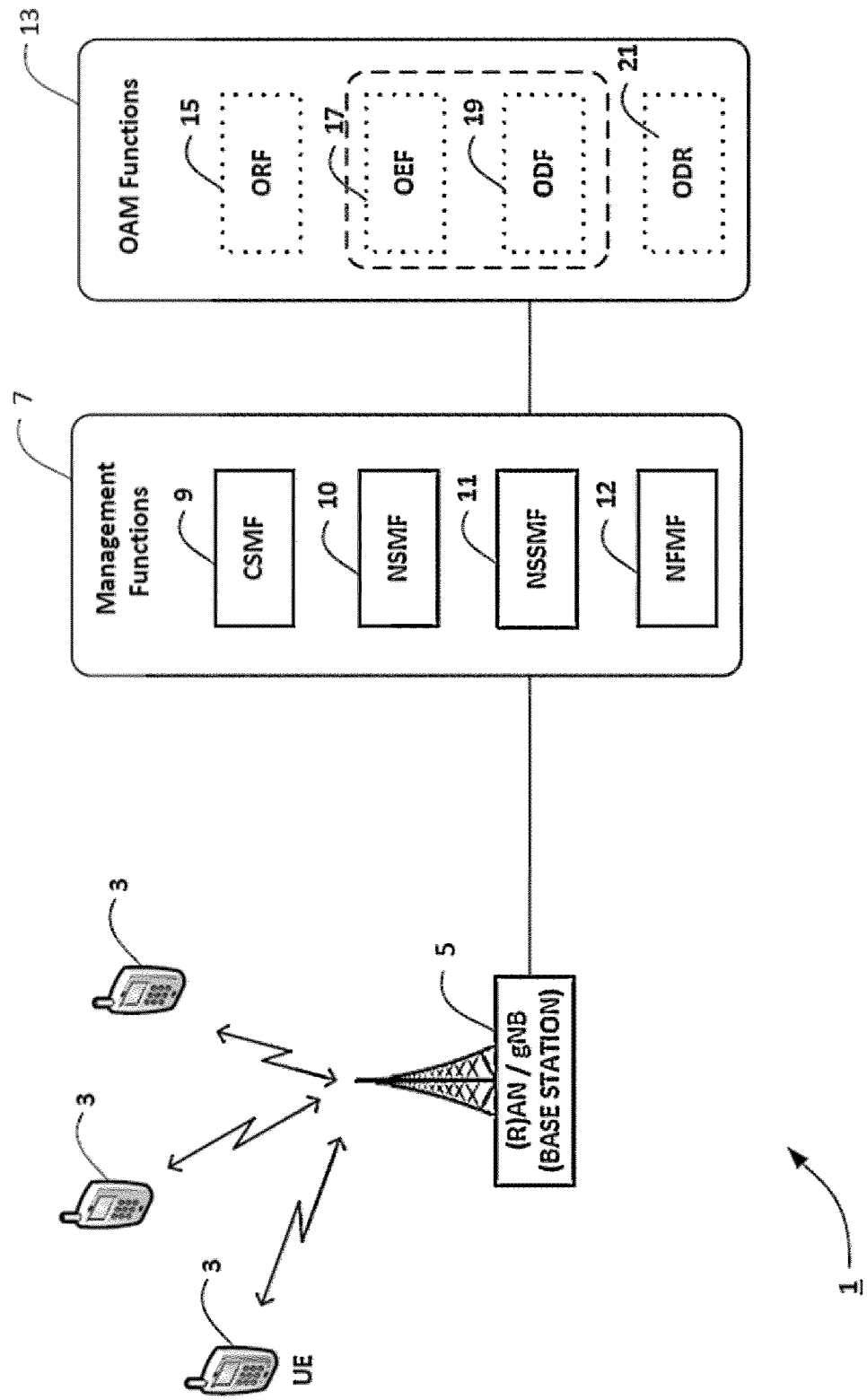
FIG. 1 illustrates schematically a generic mobile (cellular or wireless) telecommunication system to which embodiments of the invention may be applied.

Being a service based architecture model, the increase in the number of management functions and entities within the 3GPP OAM system along with the increased development on future generation networks and introduction of diversity of services leading to even more complex management and operational requirements would potentially raise several key problems that need to be addressed, such as:

How a management function interacts and interworks with other management functions within the OAM system, for example how a management function can find a suitable instance of another management function?, and how a management function inform other management functions the status of its instance(s)?

How OAM entities discover and subscribe to a specific management service(s)?

How other entities (functions, applications, etc.) external to the OAM system know the functionalities and services offered by a management function inside OAM system?

How to facilitate exchange of services and information with external entities (e.g. secure provisioning, transformation, filtering, etc.)

What procedures are needed to address the above problems?

To facilitate the interaction and exchange of services among the management functions through the service based interface it is provided for additional functional entities to the OAM system such as a local registry function to facilitate functional service discovery and exposure.

In addition, the increased number of management entities and functionalities with the requirement of close interworking and interaction between the functions within the OAM system and with external functions/applications to provide efficient network and service management and orchestration, along with the step increase in management data and the frequent need to share and exchange the data among many management entities and with external entities can be advantageously addressed by a dedicated data repository function for management data in the OAM system.

Accordingly, embodiments of the present invention provide methods and associated apparatus that address or at least alleviate (at least some of) the above issues.

An embodiment of the present invention provides a method performed by a node for an Operations, Administration and Management, OAM, system, the method comprising: maintaining information relating to at least one service provided by at least one node of the OAM system; and providing said information to a management function coupled to said OAM system.

An embodiment of the present invention provides a method performed by a management function for a communication network, the method comprising: communicating with a node of an Operations, Administration and Management, OAM, system; and obtaining, from said node, information relating to at least one service provided by at least one node of the OAM system.

An embodiment of the present invention provides a node for an Operations, Administration and Management, OAM, system, the node comprising a memory storing instructions and one or more processors configured to execute the instructions to: maintain information relating to at least one service provided by at least one node of the OAM system; and provide said information to a management function coupled to said OAM system.

An embodiment of the present invention provides a management function for a communication network, the management function comprising a memory storing instructions and one or more processors configured to execute the instructions to: communicate with a node of an Operations, Administration and Management, OAM, system; and obtain, from said node, information relating to at least one service provided by at least one node of the OAM system.

An embodiment of the present invention also provides a node for an Operations, Administration and Management, OAM, system, the node comprising: means for maintaining information relating to at least one service provided by at least one node of the OAM system; and means for providing said information to a management function coupled to said OAM system.

An embodiment of the present invention also provides a management function for a communication network, the management function comprising: means for communicating with a node of an Operations, Administration and Management, OAM, system; and means for obtaining, from said node, information relating to at least one service provided by at least one node of the OAM system.

Embodiments of the invention extend to corresponding systems and computer program products such as computer readable storage media having instructions stored thereon which are operable to program a programmable processor to carry out a method as described in the embodiments and possibilities set out above or recited in the claims and/or to program a suitably adapted computer to provide the apparatus according to an embodiment of the present invention.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Overview

FIG. 1 schematically illustrates a mobile (cellular or wireless) telecommunication system 1 to which the above embodiments are applicable.

In this network, users of mobile devices 3 (or user equipment, 'UE') can communicate with each other and other users via respective base stations 5 and a core network using a 5G radio access technology (RAT). It will be appreciated that a number of base stations 5 (or 'gNBs' in 5G networks) form a (radio) access network. As those skilled in the art will appreciate, whilst three mobile devices 3 and one base station 5 are shown in FIG. 1 for illustration purposes, the system, when implemented, will typically include other base stations and mobile devices. It will also be appreciated that the (radio) access network may also support an E-UTRA radio access technology (e.g. instead of or in addition to 5G).

A number of logical nodes 7, referred to as management functions, are provided for supporting communication in the telecommunication system 1. Typically, for example, the management functions include, amongst other functions, at least one CSMF 9, NSMF 10, NSSMF 11, and/or NFMF 12 such as described above.

To facilitate the interaction and exchange of services among the management functions through a service based interface, and to provide support for the increased number of management entities and functionalities and the requirement of interworking and interaction between the functions, one or more additional functional entities are also provided in a modified OAM system 13. These may include, for example, at least one ORF 15, OEF 17, ODF 19, and/or ODR 21 such as described above.

Beneficially, the nodes of this system are configured to perform one or more of the following functionalities:
- profile record registration and maintenance for at least one Management Function 7 (and/or any other OAM System entity);
- functional service discovery among Management Functions 7, allowing a particular Management Function 7 to find a suitable instance of another Management Function 7;
- Management Functions 7 advertising (informing) each other regarding the status of their instances;
- exposure of management service/functional capabilities to other potential consumers and/or producers of management services external to the OAM system;
- information exchange provisioning between external and internal entities (service producers and consumers); and
- enabling OAM System entities to save and maintain data/information records into an OAM Data repository.

OAM Function (e.g. ORF/OEF/ODF/ODR)

Figure 2:
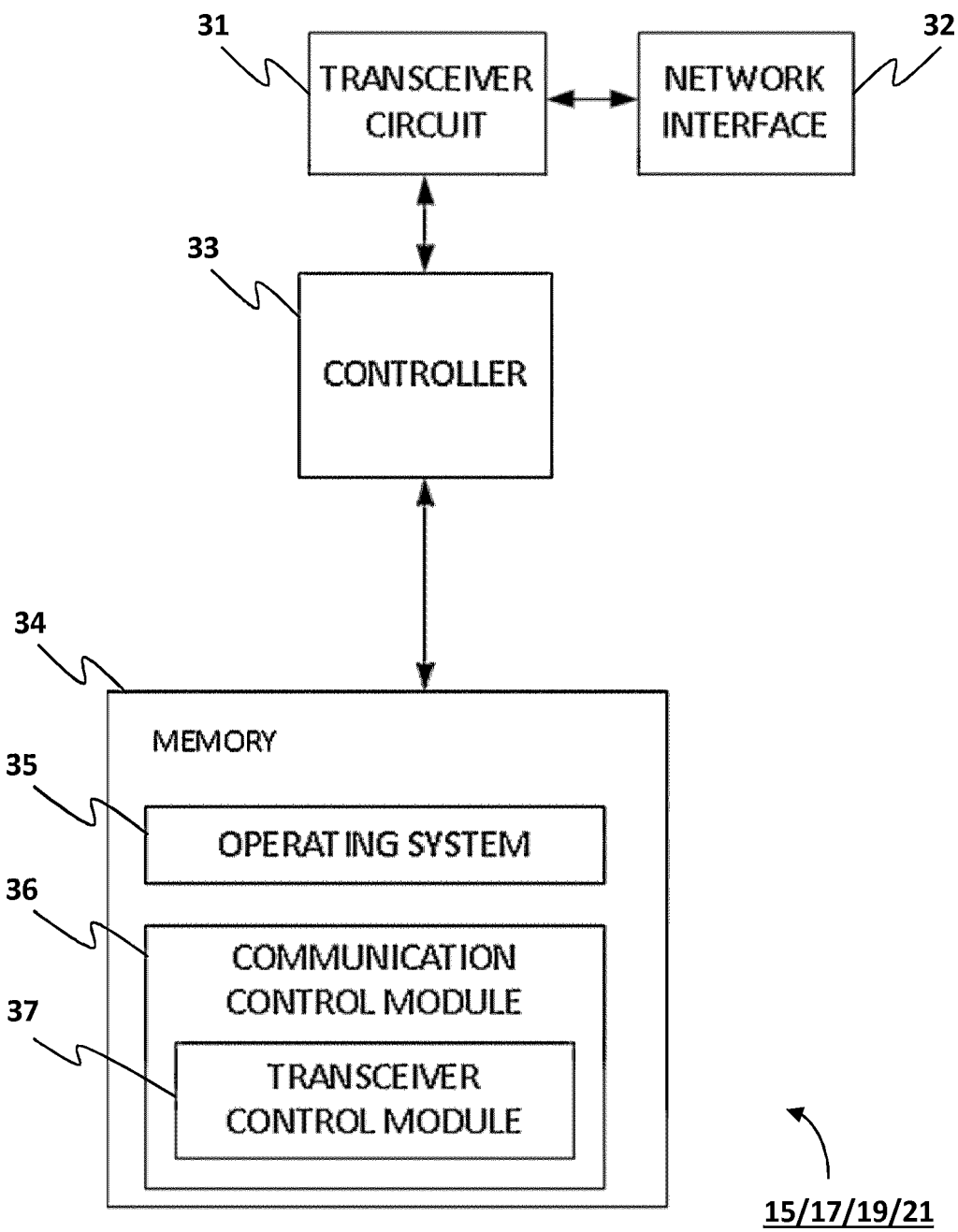
FIG. 2 is a schematic block diagram of an OAM function forming part of the system shown in FIG. 1.

FIG. 2 is a block diagram illustrating the main components of an OAM function 13, such as the ORF 15, OEF 17, ODF 19 or ODR 21. As shown, the apparatus includes a transceiver circuit 31 which is operable to transmit signals to and to receive signals from other nodes (including network functions and/or network management functions such as NSMF 10, NSSMF 11, NFMF 12, CSMF 9 etc.) via a network interface 32. A controller 33 controls the operation of the apparatus in accordance with software stored in a memory 34. Software may be pre-installed in the memory 34 and/or may be downloaded via the telecommunication network 1 or from a removable data storage device (RMD), for example. The software includes, among other things, an operating system 35 and a communications control module 36 having at least a transceiver control module 37. The communications control module 36 (using its transceiver control sub-module 37) is responsible for handling (generating/sending/receiving) signalling between the OAM function 13 and other nodes, such as the network functions and/or network management functions 7 (e.g. the NSMF 10, NSSMF 11, NFMF 12, CSMF 9 etc.).

The software comprises modules for supporting the functions of the OAM function 13.

In the case of the ORF 15, for example, the software modules provide, amongst other functionalities, the Service Discovery functionality and External Service Exposure functionality.

In the case of the OEF 17, for example, the software modules provide, amongst other functionalities, the ability to act as a gateway between OAM functions 13 and other potential functions or applications external to OAM system and external service exposure functionalities such as: exposure of management service/functional capabilities to other potential consumers and/or producers of management services external to the OAM system; and information exchange provisioning such as translation, filtering, authorization/authentication, etc. between OAM functions 13 and other external entities.

In the case of the ODF 19, for example, the software modules provide, amongst other functionalities, the ability to act as a gateway between OAM functions 13 within the OAM system and handle service discovery functionality such as: maintaining an up-to-date profile of available functions instances and their supported services; supporting service discovery functionality for management functions within the OAM system; enabling an OAM System entity (e.g., Management Function 7) to find a suitable instance of other management functions; allowing Management Functions 7 to advertise or inform other Management Functions 7 the status of its instances; and/or enabling Management Functions 7 to discover and subscribe to a specific management services offered by other functions/entities.

In the case of the ODR 21, for example, the software modules provide, amongst other functionalities, the ability to function as a centralized data repository for the Management Functions 7 and services within the OAM system. This functionality includes, for example, the ability to serve: storage and retrieval of data/information for at least one of MF Exposure and Discovery functions; storage and retrieval of data/information to support Automation/SON related and Management Data Analytics Services; storage and retrieval of data/information to support management of Network Slicing at network slice, network slice subnet, network functions and/or UE level; storage and retrieval of management related data/information including policy related, performance, configuration, and alarm information; storage and retrieval of information/data (where required by any OAM function 13); storage and retrieval of MDT, KPIs, QoE related data/information; and/or storage and retrieval of operator's specific management related data/information.

Management Function (e.g. NSMF/NSSMF/NFMF/CSMF)

Figure 3:
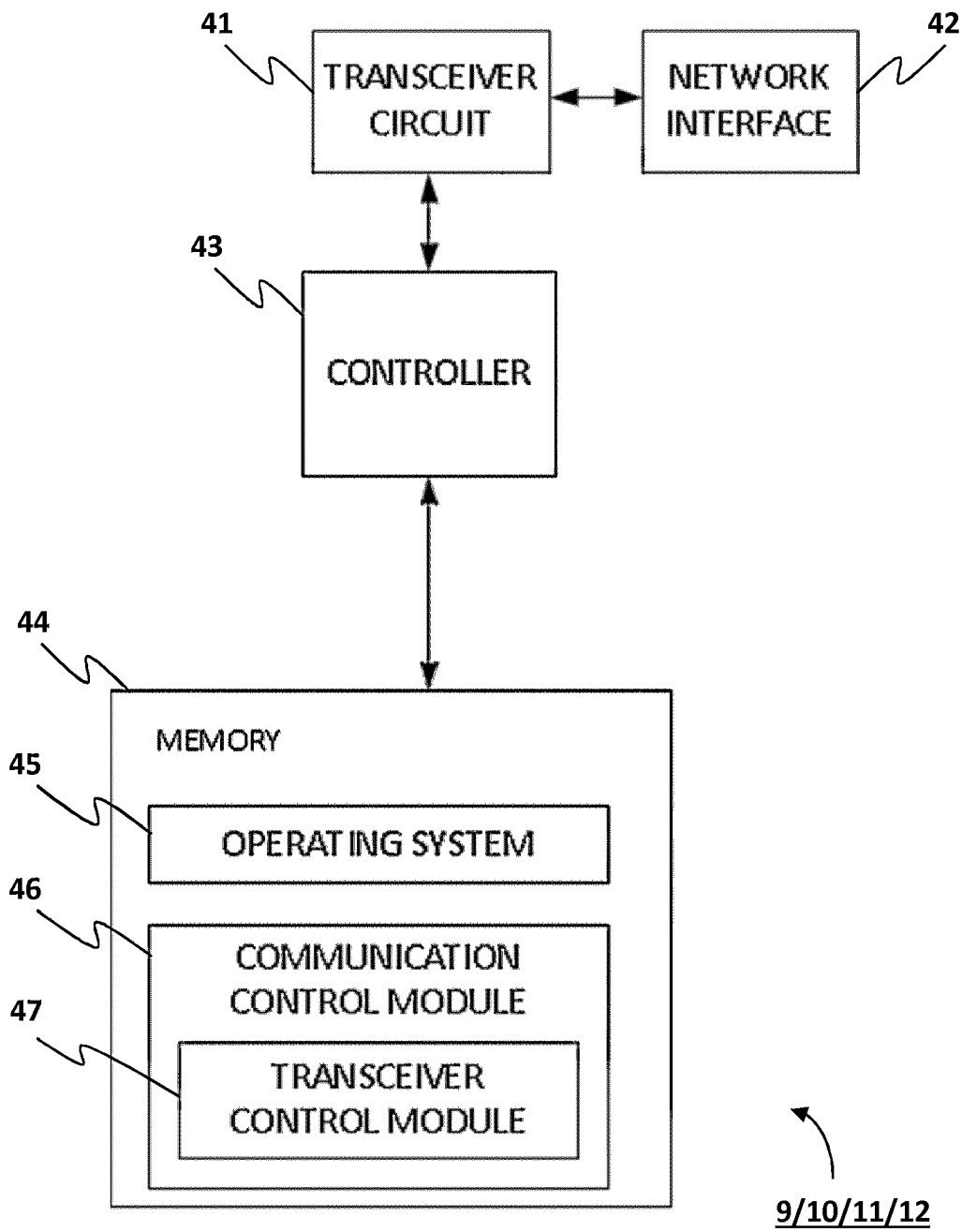
FIG. 3 is a schematic block diagram of a management function forming part of the system shown in FIG. 1.
Figure 4:
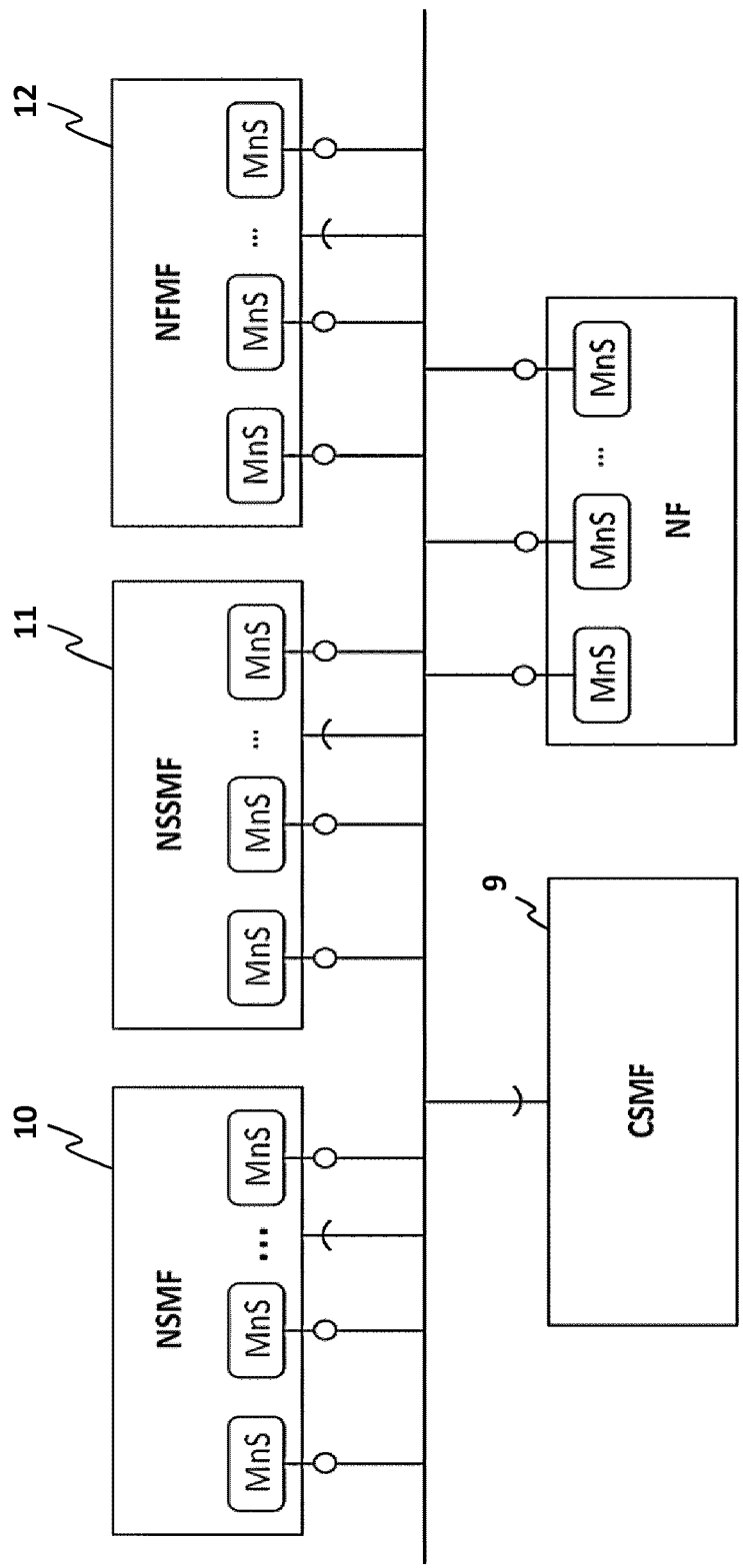
FIGS. 4 to 12 illustrate schematically some exemplary ways in which embodiments of the present invention may be implemented in the system shown in FIG. 1.

FIG. 3 is a block diagram illustrating the main components of a management function 7, such as the NSMF 10, NSSMF 11, NFMF 12 or CSMF 9. As shown, the apparatus includes a transceiver circuit 41 which is operable to transmit signals to and to receive signals from other nodes (including OAM functions such as the ORF 15, OEF 17, ODF 19 or ODR 21 etc.) via a network interface 42. A controller 43 controls the operation of the apparatus in accordance with software stored in a memory 44. Software may be pre-installed in the memory 44 and/or may be downloaded via the telecommunication network 1 or from a removable data storage device (RMD), for example. The software includes, among other things, an operating system 45 and a communications control module 46 having at least a transceiver control module 47. The communications control module 46 (using its transceiver control sub-module 47) is responsible for handling (generating/sending/receiving) signalling between the management function 7 and other nodes, such as OAM functions 13, network functions and/or other management functions (e.g. the NSMF 10, NSSMF 11, NFMF 12, CSMF 9 etc.).

In order to address the problem of lack of OAM functional service discovery and exposure and the need for OAM data repository functions, the following two embodiments are described.

Embodiment 1: Introduction of a New Function into the Management Architecture Acting as a Centralized OAM Registry Function to Provide Functional Service Discovery and Exposure (OAM Registry Function—ORF)

Figure 5:
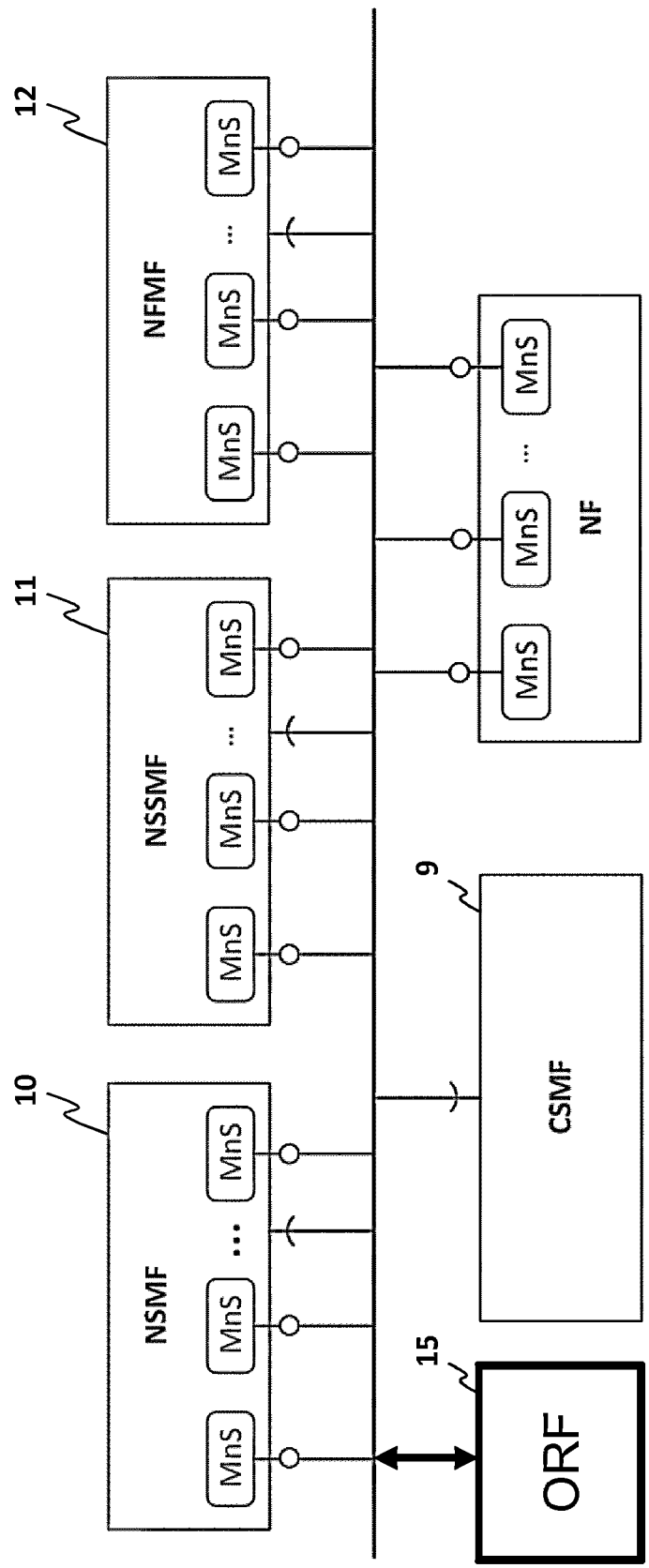

The new function, herein referred to as the OAM Registry Function (ORF) 15, serves as a functional service discovery for at least one OAM Function 13 within the OAM system, and a functional service exposure with functions and applications external to the OAM system including for example 3rd party entities (see FIG. 5 which shows a Functional management architecture example with addition of ORF 15 (OAM Registry Function)). It will be appreciated that the ORF 15 may have any other suitable name and/or (at least some of) its functionalities may be provided via another suitable network node (existing or new).

The ORF 15 will act as a "gateway" between the OAM functions themselves, as well as with other functions and applications outside the OAM system that produce service(s) consumed by the OAM functions and/or consume service(s) produced by the OAM functions.

The ORF 15 offers a number of functionalities including one or more of the following functionalities:

Service Discovery:
   Maintaining an up-to-date profile of available functions instances and their supported services,
   Supporting service discovery functionality for management functions 7 within the OAM system, for example:
      Enabling an OAM System entity (e.g., Management Function 7) to find a suitable instance of other management functions 7,
      Allowing Management Functions 7 to advertise or inform other Management Functions 7 the status of its instances,
      Enabling Management Functions 7 to discover and subscribe to a specific management services offered by other functions/entities.

External Service Exposure:
   Exposure of management service/functional capabilities to other potential consumers and/or producers of management services external to the OAM system,
   Information exchange provisioning, for example:
      Translation, filtering, authorization/authentication, etc. between OAM functions 13 and other external entities e.g. 3rd party functional services/applications/entities.

The ORF 15 may store/retrieve data/information using a shared or dedicated data repository within the OAM system or as part of the core network system.

The details of the services supported by ORF 15 and corresponding procedures are described in the following sections.

1. Service Discovery

The service discovery procedures allow a Management Function (MF) 7 in the OAM system to register, update or deregister its profile.

The service discovery procedures also provides consumers of specific MF service(s) with notifications of newly added MF instances, updated MF instances and/or deregistered MF instances at the ORF 15. Notifications can be sent to all (or at least one) MF 7 registered at the ORF 15 (consumers of ORF service) or based on subscription only to a specific MF(s) 7 that consume or have interest in specific service type(s) or the service(s) of a specific MF instance.

While maintaining their profile, MFs 7 can also change their status at the ORF 15 (available, unavailable) both at a function instance or at a specific offered service type level.

1.1 Management Functions Profile Maintenance

The ORF 15 records and maintains a register of the profile of Management Functions instances in the OAM system by adopting a dedicated service named "MFProfileManagment" or any other suitable service or message for the purpose.

The profile attributes of a Management Function instances maintained/recorded at the ORF 15 includes all or a subset of the following information and/or any other attributes/parameters to serve the purpose of identifying MFs 7 and their corresponding instances and/or services:

Management Function instance ID (e.g. a Fully Qualified Domain Name (FQDN) or an Internet Protocol (IP) address of the MF 7),
   Management Function type,
   PLMN ID,
   Network Slice, Network Slice subnet and Network Functions related identifiers,
   Management function specific authorisation/authentications information,
   Name and type of supported/offered services by the Management Function 7,
   Endpoint address(es) of instances of each supported service,
   Identification of stored data/information at the data repository.

The profile records are not restricted to the list above and can also include other attributes/parameters where relevant and applicable.

The procedures corresponding to each of the aforementioned operations (e.g., Register, Deregister, Update) are based on Request/Response process and are described below:

OAM Function profile registration at ORF: OAM Function profile is registered at the ORF 15 by adopting the procedure "MfFProfileManagmentRegister", or any other suitable procedure or messaging operation for the purpose. The input parameters of the registration request message may include all or a subset of the profile attributes listed above.
   OAM Function profile update at ORF: OAM Function profile is updated at the ORF 15 by adopting the procedure "MFProfileManagmentUpdate", or any other suitable procedure or messaging operation for the purpose. The input parameters of the update request message may include all or a subset of the profile attributes listed above.
   OAM Function profile deregistration at ORF: OAM Function registration profile is deleted and status is declared as unavailable at the ORF 15 by adopting the procedure "MFProfileManagmentDeregister", or any other suitable procedure or messaging operation for the purpose. The input parameters of the deregistration request message may include all or a subset of the profile attributes listed above.

1.2 Management Functions Status Change

While maintaining its profile at the ORF 15, an OAM Function 13 or function instance status can be declared as indefinitely unavailable or unavailable for a predefined period of time. The default status is available. The availability/unavailability status can also be declared per specific service from the range of services offered by the MF 7. A dedicated service named "MFStatusManagment", or any other suitable service or message for the purpose may be adopted for the status change.

Status declaration of a MF 7 can be registered at the ORF 15 (based on Request/Response) operation by adopting the procedure "MFStatusManagment Change", or any other suitable procedure or messaging operation for the purpose. The input parameters of the status update request message may include MF ID and other profile attributes e.g. service type or service ID where applicable, and a status flag (unavailable, unavailable for period of time, or available depending on current/default status).

1.3 Status subscribe/Notify of Management Function

A dedicated service named "MFStatusManagmentUpdate" or any other suitable service or message for the purpose allows Management Functions 7 registered at the ORF 15 to subscribe to receive notifications. The notification is triggered by one or more of the following conditions/events:

- Newly registered MF 7 along with its offered service(s) and/or available instances,
- New service becomes available,
- Updated MF profile,
- Deregistered MF,
- Status change of an existing MF/MF instance and/or service (available, unavailable indefinitely or temporarily for a pre-specified period of time).

The corresponding operational procedures are described below:

- Status subscribe: the registered functions at ORF 15 (consumers of ORF service) can subscribe to receive notifications by invoking the procedure "MFStatusManagmentUpdateSubscribe", or any other suitable procedure or messaging operation for the purpose. The input parameters of the status notification subscribe message may include specific MF(s)/MF instance(s) and/or service type ID and other parameters such as a specific trigger for the notification from those mentioned above where applicable.
- Status notify: The ORF 15 allows subscribed functions, as per above procedure, to receive notifications when one or more of the above triggers occur, by invoking the procedure "MFStatusManagmentUpdateNotifiy", or any other suitable procedure or messaging operation for the purpose. The input parameters of the status update notification message may include specific MF(s)/MF instance(s) and/or service type ID and where applicable other parameters such as reason for the notifications.
- Status unsubscribe: the registered functions at ORF 15 (consumers of ORF service) can unsubscribe to stop receiving notifications from ORF 15 by invoking the procedure "MFStatusManagmentUpdateUnsubscribe", or any other suitable procedure or messaging operation for the purpose. The input parameters of the status unsubscribe message may include specific MF(s)/MF instance(s) and/or service type ID and where applicable other parameters.

1.4 Discovery of Management Service

The service discovery procedure allows one MF to discover a target MF instance or a set of MF instances with a specific service(s) types. A Dedicated service named "MFDiscoveryManagment" or any other suitable service or message for the purpose based on Request/Response operation will be adopted as follows:

- Discovery request: the discovery request may be invoked by adopting the procedure "MFDiscoveryManagmentRequest", or any other suitable procedure or messaging operation for the purpose. The input parameters of discovery request message may include MF/MF instance and/or service type ID and other profile attributes where applicable.
- Discovery response: the discovery response may be invoked by adopting the procedure "MFDiscoveryManagmentResponse", or any other suitable procedure or messaging operation for the purpose. The input parameters of discovery response message may include MF/MF instance and/or service type ID and other profile attributes where applicable.

The input to the discovery request can be one or a subset of the following profile information/parameters:

- Management Function instance ID (e.g. FQDN or IP address of MF 7),
- Management Function type,
- PLMN ID,
- Network Slice related identifiers,
- Management function specific authorisation/authentication information,
- Name and type of supported services by the Management Function 7,
- Endpoint address(es) of instances of each supported service,
- Identification of stored data/information at the data repository.

The input parameters/information of the discovery request is not restricted to the list above and can also include other profile attributes/parameters where required and applicable.

The discovery response will include a target MF(s), MF instances or a service(s) identification corresponding to the attributes included in the input information of discovery request.

2. External Service Exposure

The ORF 15 can also include a function to facilitate interaction and exchange of management data/information/requirements of Management Functions 7 (within the OAM system) with other external functions or entities including management functions 7 and application functions such as those provided by a 3rd party (e.g. vertical or communication service providers). The interaction can be uni- or bidirectional allowing OAM Functions to consume services produced by external entities and/or allow external entities to consume services produced by the Management Functions 7 within the OAM system.

The ORF external exposure function can serve a wide range of use cases for the interaction and exchange of data/information/requirements between OAM functions and external entities (e.g. functions/applications) including:

- Communication of management related requirements/data/information with external entities such as Transport Network Layer (TNL) manager or other external management entities during the provisioning phase of a communication service, a service package, a network slice, a network slice subnet, a subnet, etc.
- Interaction and exchange of management data/information/requirements with external entities, including but not limited to the followings cases/scenarios;
  - Application functions or other relevant management functions 7 or entities to facilitate management of Edge Computing,
  - Managements functions/entities of ETSI MANO where Virtualised Network Functions/resources are involved,
  - SDN controllers,
  - Management functions/Application Functions/Entities for responsible for managing Non-3GPP parts of the network.
- Interaction and exchange of management data/information/requirements with third party entities such as Verticals or Communication Service Providers to facilitate use cases such as Network Slice as a Service (NSaaS), Business to consumer (B2C) services, Business to Business (B2B) services, Business to household services.

Aggregation of customized combinations of management services offered by OAM entities for external management service consumers.

The ORF external exposure function allows OAM Functions 13 to securely expose capabilities including their offered management service types to external functions or entities. Similarly the ORF 15 also allows MFs 7 within the OAM system to discover and consume services produced by external functions. The ORF 15 will act as a gateway and facilitate secure provisioning of management data/information/requirements exchanged with external management entities/functions/applications. In this respect the ORF 15 may provide number of services including for example:

Authentication and authorization process,

Facilitate provisioning (e.g. exchange, translation, filtering and representation) of information/data/requirements between OAM functions and external 3rd party functional services/applications), The provisioning process can be set according to a predefined (configured) policy/use case specific policy at the ORF external service exposure function.

The above is not exhaustive and may include other services.

The profile records maintained by the ORF 15 for the MFs 7 of the OAM system can also still be utilized for the process of external service exposure process with external entities. A Separate profile records of external entities may also be maintained at the ORF 15 to aid the process of external service exposure process.

The procedure of service exposure functionality and exchange of information between management service producer and management service consumer can be based on Request-Response and/or Subscribe-Notify communication paradigm.

2.1 Subscribe-notify Service Exposure

A dedicated service named "MFServiceExposureManagementSubscription" or any other suitable service or message for the purpose may be adopted for the Management service exposure. This service is based on Subscribe-notify process.

The notification to the service consuming function may be triggered by one or more of the following conditions/events:

Newly registered MF/MF Instance/external entity along with its offered service(s) and/or available instances, Updated MF/MF Instance/external entity profile, Deregistered MF/MF Instance/external entity, Status change of MF/MF Instance/external entity (available, unavailable indefinitely or temporarily for a pre-specified period of time), Update of a specific management service and information (based on e.g., Fault/Alarm data, Configuration data, Performance/KPIs data, Network Slice/Network Slice Subnet, Subnet and/or Communication service related requirements); where appropriate and required relevant triggers for notification updates can also be based on threshold crossing.

Input parameter of the subscription request may include consuming MF/MF Instance ID and one or more of the triggering conditions listed above, type of management service, management service information/data, notification target address, etc.

Output parameter for the notification from producer to the consumer side is result indication based on the information subscribed for.

The corresponding operational procedures are described below:

Service Exposure subscribe: the registered functions at ORF 15 (consumers of ORF service) can subscribe to receive notifications by invoking the procedure "MFServiceExposureManagementSubscriptionRequest", or any other suitable procedure or messaging operation for the purpose. The input parameters of the subscription request message may include specific MF(s)/MF instance(s) and/or service type ID and other parameters such as a specific trigger for the notification from those mentioned above where applicable. Output parameter for the notification from producer to the consumer side is result indication based on the information subscribed for.

Service Exposure notification: The ORF 15 allows subscribed functions, as per above procedure, to receive notifications when one or more of the above triggers occur, by invoking the procedure "MFServiceExposureManagementSubscription Notify" or any other suitable procedure or messaging operation for the purpose. The output parameters of the notification message may include specific MF(s)/MF instance(s) and/or service type ID and where applicable other parameters such as reason for the notifications.

Service Exposure unsubscribe: the registered functions at ORF 15 (consumers of ORF service) can unsubscribe to stop receiving notifications from ORF 15 by invoking the procedure "MFServiceExposureManagementSubscriptionUnsub scribe" or any other suitable procedure or messaging operation for the purpose. The input parameters of the notification unsubscribe message may include specific MF(s)/MF instance(s) and/or service type ID and where applicable other parameters.

2.2 Request-Notify Service Exposure

A dedicated service named "MFServiceExposureNotificationManagement" or any other suitable service or message for the purpose may be adopted for the Management service exposure. This service is based on Request-notify process.

Service Exposure Notification request: the service exposure notification request may be invoked by adopting the procedure "MFServiceExposureNotification Management Request", or any other suitable procedure or messaging operation for the purpose. The input parameters of request message may include MF/MF Instance ID and other profile attributes where applicable.

Service Exposure Notification response: the service exposure notification response may be invoked by adopting the procedure "MFService ExposureNotificationManagmentResponse", or any other suitable procedure or messaging operation for the purpose. The input parameters of response message may include MF/MF Instance ID and other profile attributes where applicable. Output parameters for the notification from producer to the consumer side is result indication based on the request.

3. Potential Deployment/Implementation Alternatives

Flexible architecture to accommodate several deployment/implementation options are proposed to implement the Discovery and Exposure functions.

3.1 Distributed OAM Functional Service Discovery Function at Each OAM Function while Keeping a Centralized OAM Functional Service Exposure Function The OAM system has a new centralized OAM functional service Exposure Function (OEF) 17 and a distributed OAM functional service Discovery Function (DF). However, it will be appreciated that these newly introduced functions may be referred to using any other suitable names.

Figure 6:
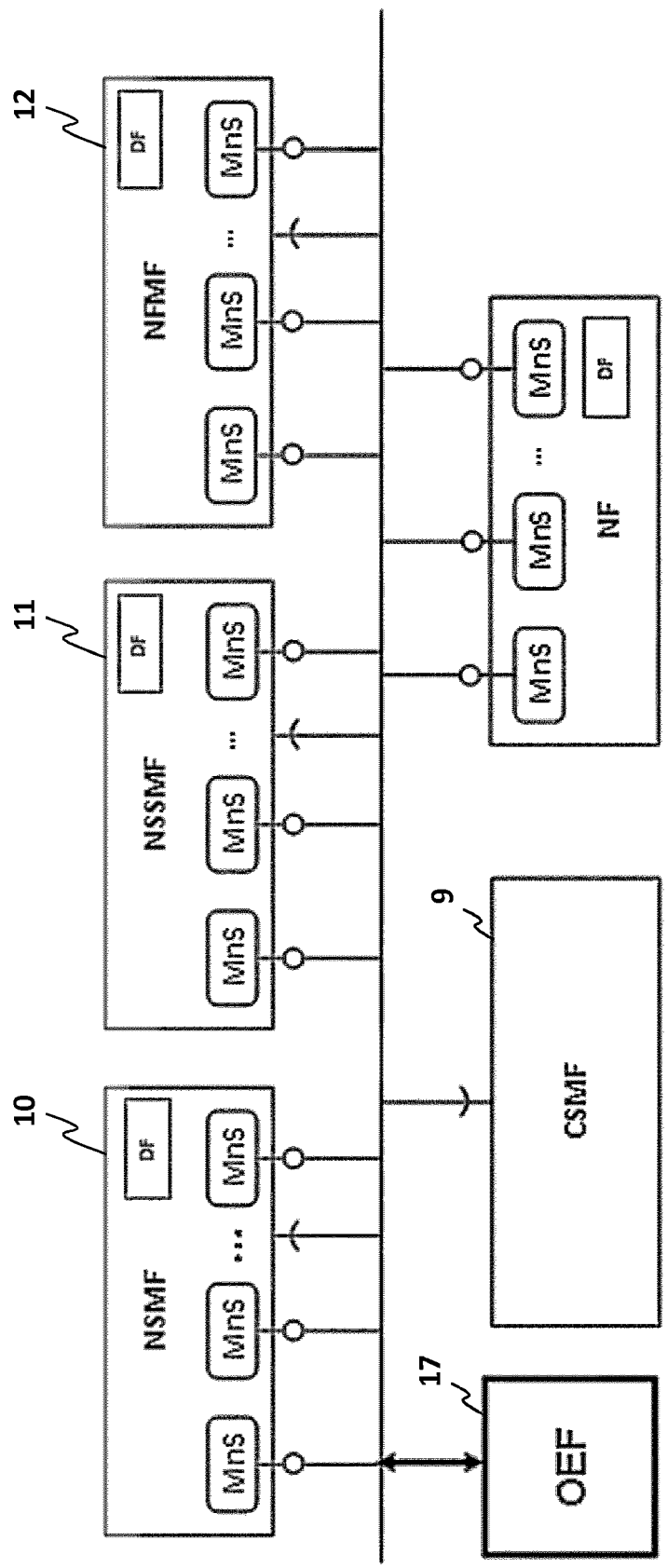

FIG. 6 illustrates the implementation/deployment scenario (Distributed Discovery Functions (DF) and centralized Exposure function (OEF 17)).

The OEF 17 is responsible for all or at least one OAM function acting as a gateway between OAM functions and other potential functions or applications external to OAM system that consume management services produced by the OAM functions and/or produce services that are consumed by the OAM functions. The OEF 17 handles the following external service exposure functionalities:

Exposure of management service/functional capabilities to other potential consumers and/or producers of management services external to the OAM system,
Information exchange provisioning, for example:
Translation, filtering, authorization/authentication, etc. between OAM functions and other external entities e.g. 3rd party functional services/applications/entities.

The Discovery Functions (DF) are distributed at each OAM function; and handle service discovery functionality which include:

Maintaining an up-to-date profile of available functions instances and their supported services,
Supporting service discovery functionality for management functions 7 within the OAM system, for example:
Enabling an OAM System entity (e.g., Management Function 7) to find a suitable instance of other management functions 7,
Allowing Management Functions 7 to advertise or inform other Management Functions 7 the status of its instances,
Enabling Management functions 7 to discover and subscribe to a specific management services offered by other functions/entities.

The OEF 17 and DF may store/retrieve data/information using a shared or dedicated data repository within the OAM system or as part of the core network system.

3.2 Two Separate Centralized Functions One Acting as a OAM Functional Service Exposure Function and Another as a OAM Functional Service Discovery Function Introduction of two new functions into the management architecture acting as a centralized OAM functional service exposure (OEF 17) and as a centralized OAM functional service Discovery function (ODF 19). However, it will be appreciated that these newly introduced functions may be referred to using any other suitable names.

Figure 7:
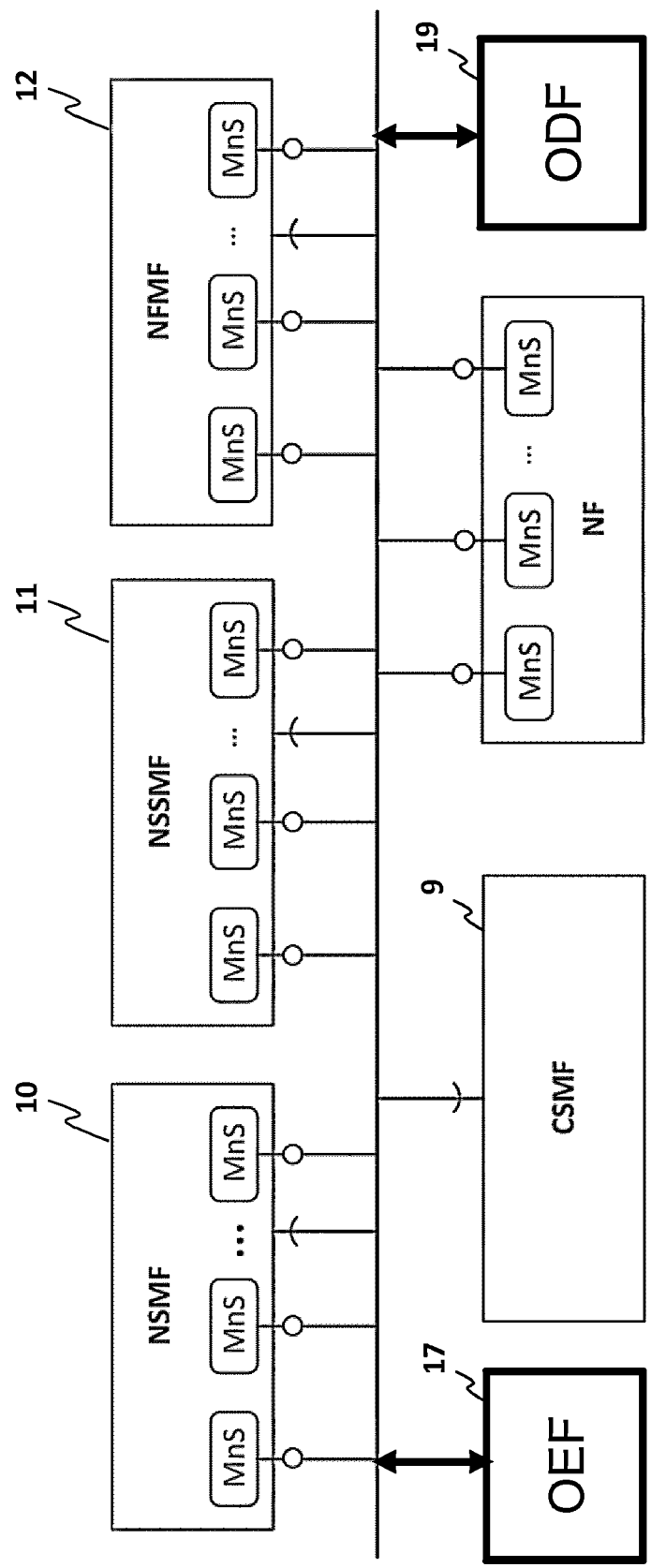

FIG. 7 illustrates the implementation/deployment scenario (Separate centralized functions for Service Exposure (OEF 17) and Discovery (ODF 19)).

The OEF 17 is responsible for all or at least one OAM function acting as a gateway between OAM functions and other functions or applications external to OAM system that consume management services produced by the OAM functions and/or produce services that are consumed by the OAM functions. The OEF 17 handle the following external service exposure functionalities:

Exposure of management service/functional capabilities to other potential consumers and/or producers of management services external to the OAM system,
Information exchange provisioning, for example:
Translation, filtering, authorization/authentication, etc. between OAM functions and other external entities e.g. 3rd party functional services/applications/entities.

The Discovery Functions (ODF 19) is responsible for at least one OAM functions acting as a gateway between OAM functions within the OAM system and handle service discovery functionality which include:

Maintains an up-to-date profile of available functions instances and their supported services,
Supports service discovery functionality for management functions 7 within the OAM system, for example:
Enabling an OAM System entity (e.g., Management Function 7) to find a suitable instance of other management functions 7,
Allowing Management Functions 7 to advertise or inform other Management Functions 7 the status of its instances,
Enabling Management functions 7 to discover and subscribe to a specific management services offered by other functions/entities.

The OEF 17 and ODF 19 may store/retrieve information/data using a shared or dedicated data repository within the OAM system or as part of the core network system.

Embodiment 2: Introduction of a Dedicated OAM Data Repository Function

Figure 8:
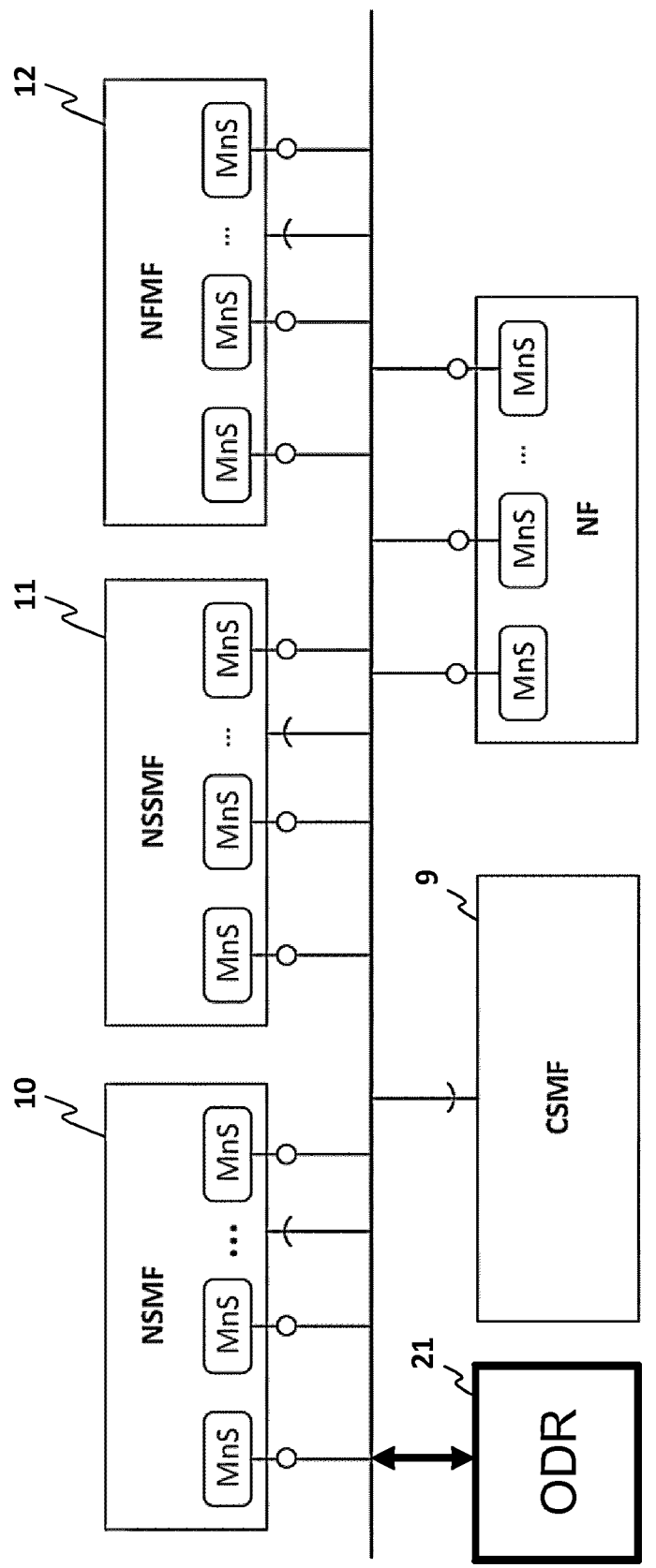

This embodiment describes the introduction of a dedicated data repository for OAM system, to be used as a centralized data repository for the management functions 7 and services within the OAM system as illustrated in FIG. 8 (Functional management architecture example with addition of an OAM Data Repository (ODR) 21).

This dedicated data repository for OAM system referred to as OAM Data Repository (ODR) 21, or by any other suitable name, may be used to serve one or more of the following:

Storage and retrieval of data/information for all or at least one of MF Exposure and Discovery functions,
Storage and retrieval of data/information to support Automation/SON-related and Management Data Analytics Services,
Storage and retrieval of data/information to support management of Network Slicing at network slice, network slice subnet, network functions and/or UE level,
Storage and retrieval of management related data/information including policy related, performance, configuration, and/or alarm information,
Storage and retrieval of any type of information/data (where required by any OAM function or service),
Storage and retrieval of MDT, KPIs, QoE related data/information,
The data/information deposited at the ODR 21 may also be accessed and processed by Operator's specific, or an authorized third party tools to perform further analyses/processing,
Storage and retrieval of any operator's specific management related data/information.

Each OAM Function service consumer accessing the ODR 21, via the service interface, is able to access, add, modify, update or delete only the data it is authorised to change. This authorisation shall be performed by the ODR 21 or by another entity on a per data set and OAM Function service consumer basis. The level of access can be pre-configured at the OAM Function and at the ODR 21 or by operator's policy.

There can be multiple ODRs 21, each of which may be dedicated to accommodate specific data sets/types or subsets (e.g. Exposure-related data/information, Service discovery-related data/information, Management data/information, SON/automation/MDT related data/information, Management data analytics, Performance, Configuration, Alarm, KPI, QoE, Operator's policy data etc.).

Also ODRs 21 may serve different sets/category of OAM functions depending on the class of management services or data/information provided by the specific group or set of management functions 7.

ODRs 21 may also be implemented separately as part of the individual OAM functions or per group or category of OAM functions (MF (s)) i.e., associated with different set of Management Functions 7.

The data set/information managed by ODR 21 can be identified separately with a set of identifiers. The data set identifiers uniquely identify type or class of data/information within the ODR 21. IDs are extensible and may include attributes to specifically refer to the type of data, service, etc. and which MF 7 (source) they belong or relate to.

ODR 21 allows its service consumers to create, retrieve, update and/or delete data as well as subscribe/unsubscribe for change notifications based on the set of data applicable to the specific consumer function(s). Consumers of ODR service can access any set of data at the ODR 21 provided they are authorized to do so.

The corresponding procedure for each of the above process/operation (e.g., Create, Retrieve, Update or Delete) are based on Request/response process and are described in the subsections below:

Create Data Service
  A dedicated service named "MFDataRepositoryManagementCreate" or any other suitable service or message for the purpose allows ODR service consumer (e.g., a MF 7) to insert/create new data/information records/sets into the ODR 21. Input to this message includes Data Identifiers Set(s) and data/information set category/type.

Retrieve Data Service
  A dedicated service named "MFDataRepositoryManagmentRetrieve" or any other suitable service or message for the purpose allows ODR service consumer (e.g., a MF 7) to request (access) a specific set of data/information available at the ODR 21 with a specific identifiers. Input to this message includes Data Identifiers Set(s) and data/information set category/type.

Update Data Service
  A dedicated service named "MFDataRepositoryManagementUpdate" or any other suitable service or message for the purpose allows ODR service consumer (e.g., a MF 7) to update an existing data/information records/sets at the ODR 21 with a specific identifiers. Input to this message includes data/information Identifiers Set(s) and data/information set category/type.

Delete Data Service
  A dedicated service named "MFDataRepositoryManagement Delete" or any other suitable service or message for the purpose allows ODR service consumer (e.g., a MF 7) to delete an existing data records/sets at the ODR 21 with a specific identifiers. Input to this message includes data/information Identifiers Set(s) and data/information set category/type.

Subscribe/Unsubscribe/Notify Data Service
  This procedure allows ODR service consumers (e.g. MFs 7) to subscribe for receiving notification when an existing specific data set(s)/information is modified (updated or deleted) or new specific data set is added. The notifications are sent to all or at least one MF(s) 7 subscribed to this service and may also indicate list of MFs 7 that are being informed by this notification message.Subscribe data service: a dedicated service named "MFDataRepository ManagementSubscribe" or any other suitable service or message for the purpose allows ODR service consumer (e.g., a MF 7) to subscribe to receive notification when an existing specific data set is modified (updated or deleted) and/or new data set is added. Input to this message includes data/information Identifiers Set(s) and data/information set category/type.
  Notify data service: a dedicated service named "MFDataRepository ManagementNotify" or any other suitable service or message for the purpose allows ODR service consumer (e.g., a MF 7) to receive notification when an existing specific data set is modified (updated or deleted) and/or new data set is added. Input to this message includes data/information Identifiers Set(s) and data/information set category/type.
  Unsubscribe data service: a dedicated service named "MFDataRepository ManagementUnsubscribe" or any other suitable service or message for the purpose allows ODR service consumer (e.g., a MF 7) to perform un-subscription to stop receiving notification when an existing specific data set is modified (updated or deleted) and/or new data set is added. Input to this message includes data/information Identifiers Set(s) and data/information set category/type.

Figure 9:
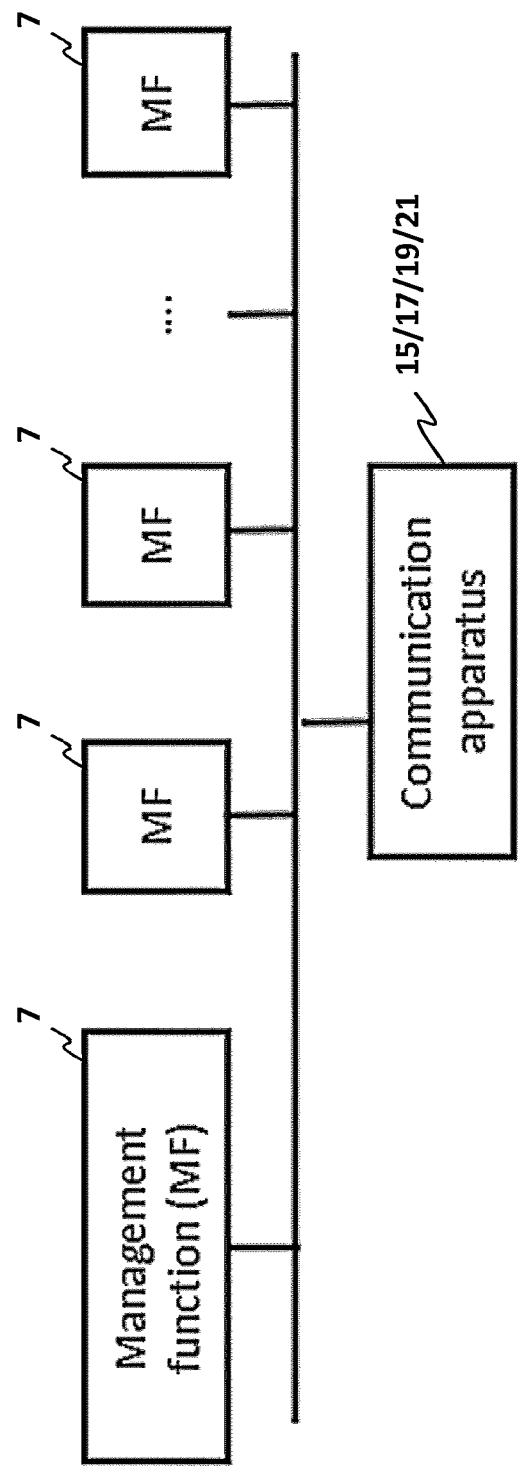

FIG. 9 shows a system diagram of one of the above exemplary embodiments.

In this figure, communication apparatus is coupled to at least one management function (MF) 7. The communication apparatus is configured to communicate with the at least one MF 7.

The communication apparatus may comprise any of the ORF 15, OEF 17, ODF 19, or ODR 21.

Figure 10:
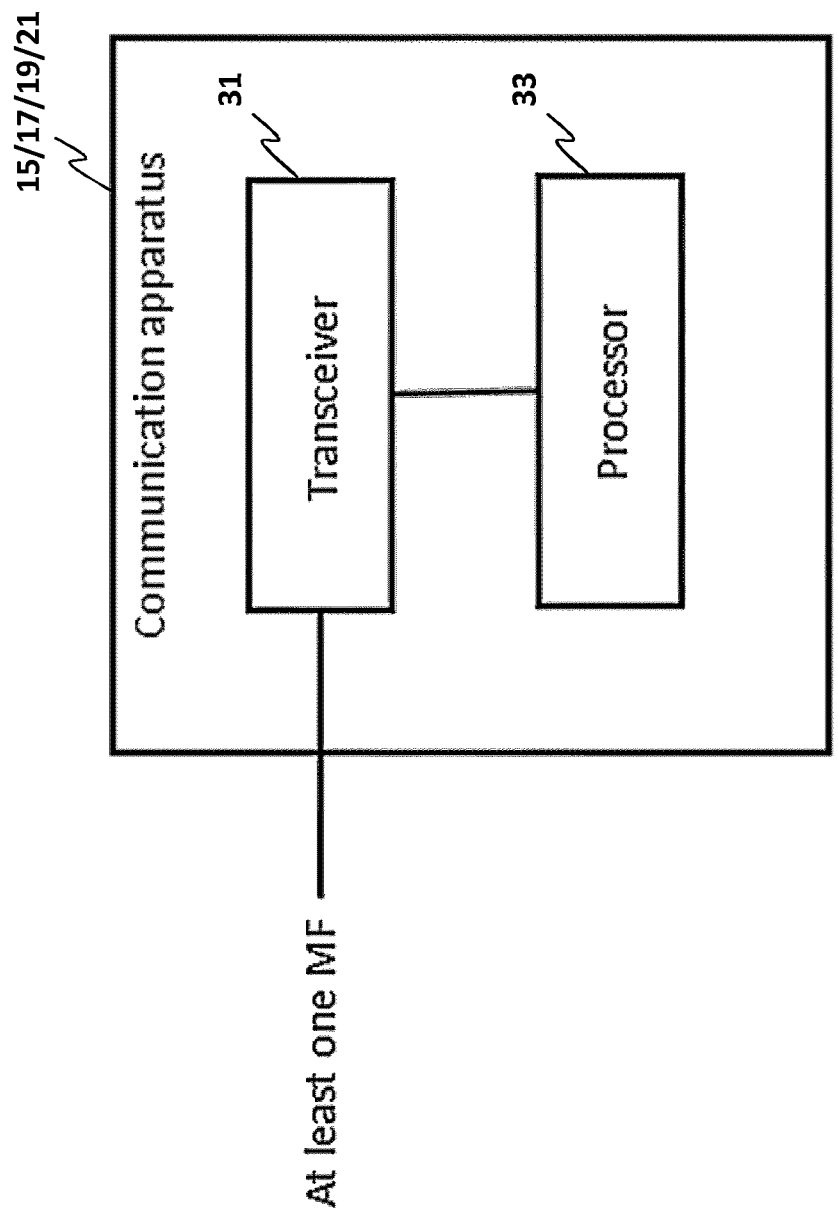

FIG. 10 shows a communication apparatus of one of the above exemplary embodiments.

The communication apparatus includes a transceiver 31 and at least one processor (controller) 33. The processor 33 is configured to control the transceiver 31 to communicate with the at least one MF 7.

The at least one processor 33 of the communication apparatus may be configured to control the transceiver 31 to provide the features of any of the ORF 15, OEF 17, ODF 19, or ODR 21 described in any of the above embodiments.

Figure 11:
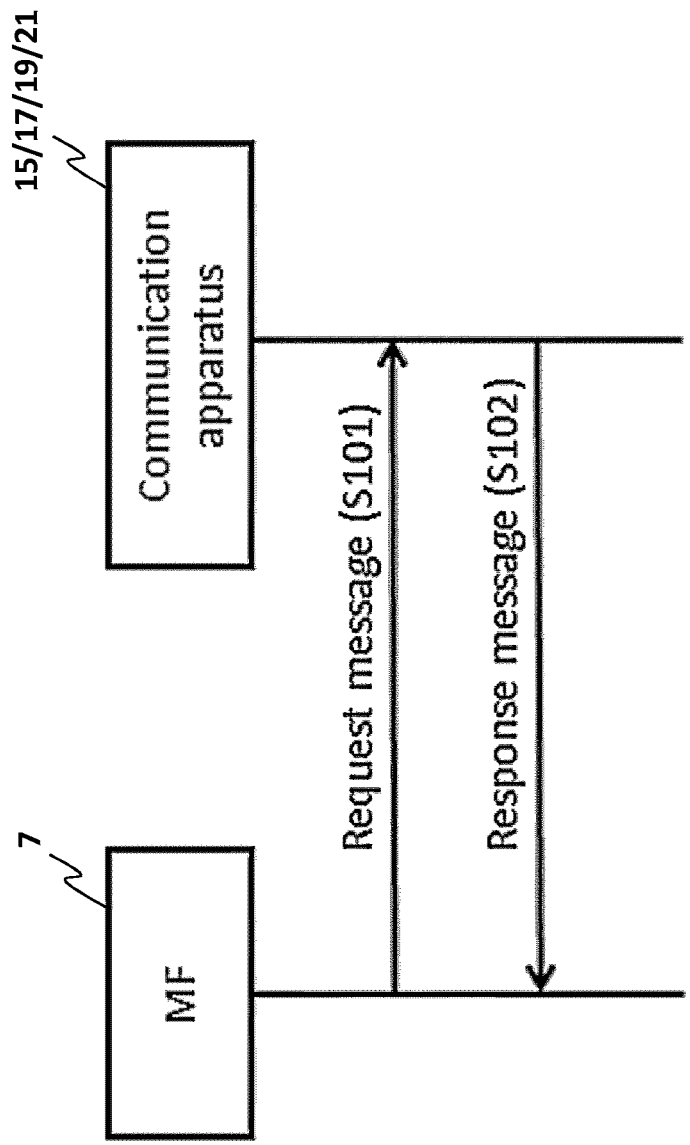

FIG. 11 shows a first flow chart of one of the above exemplary embodiments.

In S101 of this figure, the communication apparatus (which may comprise any of the ORF 15, OEF 17, ODF 19, or ODR 21) is requested by a management function 7 to invoke an operation (e.g. an operation described any of the above embodiments).

In step S102, the communication apparatus provides response based on the request by the management function 7 (e.g. a response as described in any of the above embodiments).

Figure 12:
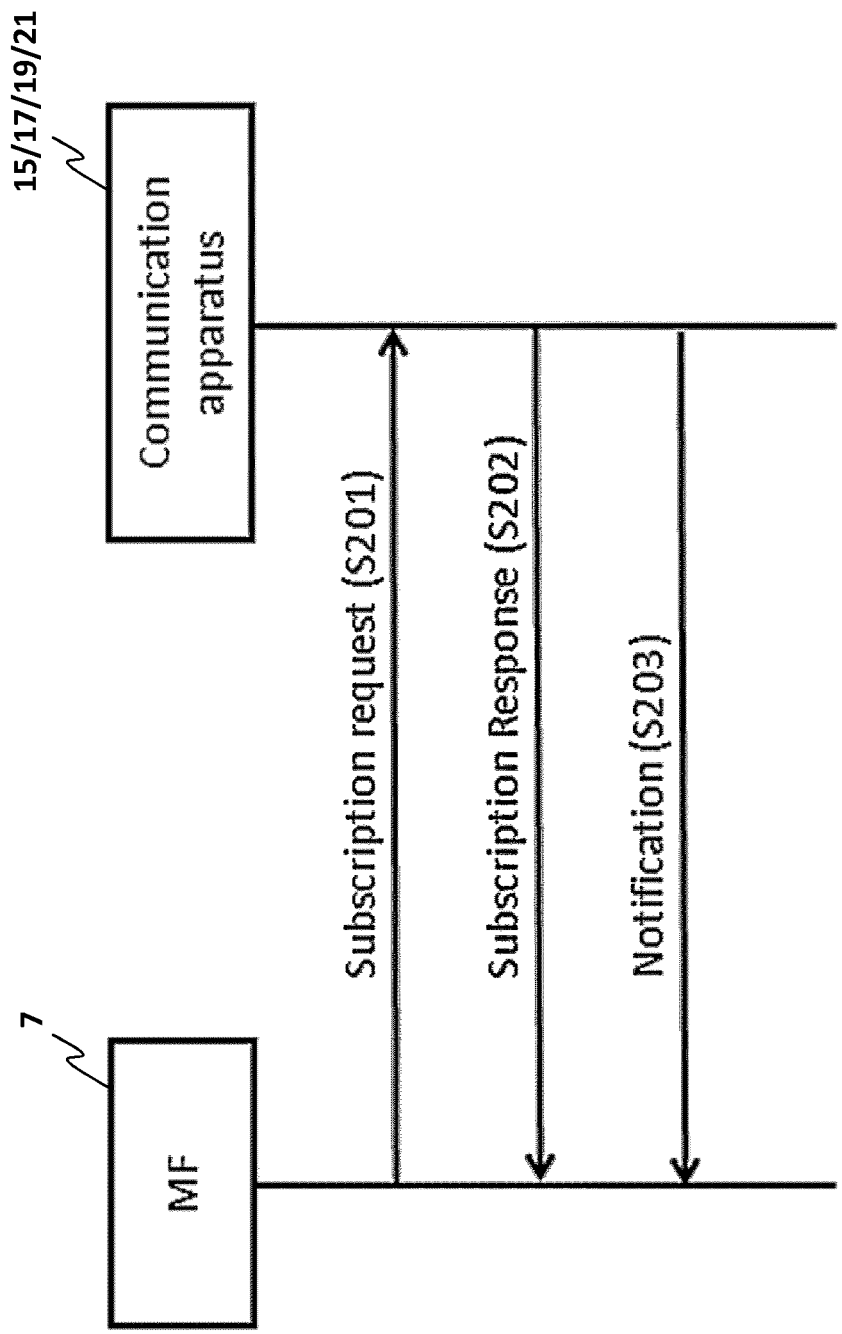

FIG. 12 shows a second flow chart of one of the above exemplary embodiments.

In step S201 of this figure, the management function 7 requests the communication apparatus to establish a subscription to receive network events via notifications (e.g. as described in the above embodiments). In step S202, the communication apparatus provides a response based on the request by the management function 7 (e.g. a response as described in any of the above embodiments). A notification may be sent under a filter constraint specified in the operation (step S203) (e.g. a notification as described in any of the above embodiments).

Beneficially, the above described exemplary embodiments include, although they are not limited to, one or more of the following functionalities:
1. OAM functional service discovery and exposure functions have been proposed for management architecture to enable discovery and exposure for management functions 7 based on service based architecture,
2. OAM Registry Function comprising functional service discovery and exposure functionalities have been introduced into the OAM system service based architecture,
3. Flexible architecture to accommodate several deployment/implementation options has been proposed to implement the Discovery and Exposure functions,
4. OAM Data Repository function has been introduced into the OAM system service based architecture,
5. New procedures, messages and corresponding parameters have been proposed for OAM functional service discovery, exposure and OAM Data Repository functions.

Beneficially, according to the above described exemplary embodiments new functional entities comprising Functional Service Discovery, Functional Service Exposure and OAM Data Repository has been introduced into the Service Based OAM System along with corresponding operational procedures and parameters.

Beneficially, according to the above described exemplary embodiments the discovery and exposure functions comprise at least some of the following steps:
1. Profile record registration and maintenance of all or at least one OAM System entities (at least one Management Function 7),
2. Enable Functional Service Discovery among Management Functions 7, allowing a Management Function 7 to find a suitable instance of another Management Function 7,
3. Allow Management Functions 7 to advertise or inform other Management Functions 7 the status of its instances,
4. Exposure of management service/functional capabilities to other potential consumers and/or producers of management services external to the OAM system,
5. Information exchange provisioning between external and internal entities (service producers and consumers).
6. Enable OAM System entities to save and maintain data/information records into an OAM Data repository.

Beneficially, according to the above described exemplary embodiments there is provided solutions for potential missing functionalities in the current OAM system service based architecture.

Beneficially, according to the above described exemplary embodiments there is provided three new functions, and corresponding procedures and parameters have been proposed, e.g., OAM functional service Discovery Function, OAM functional service Repository Function and OAM Data Repository Function.

Modifications and Alternatives

In the above description, the various functions are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE and the network apparatus as a signal over a computer network, or on a recording medium. Further, the functionality performed by part or all of this software may be performed using one or more dedicated hardware circuits. However, the use of software modules is preferred as it facilitates the updating of the UE and the network apparatus in order to update their functionalities.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

The step of maintaining said information method by the node for an OAM system may comprise at least one of registering, updating, and deregistering at least one service provided by the at least one node of the OAM system.

The information may comprise information indicating a status of said at least one service and/or information indicating an OAM instance associated with said at least one service.

The method performed by the node for an OAM system may comprise providing said information to said management function upon request and/or when a predetermined condition is met. The method may comprise storing/retrieving information using a shared or dedicated data repository.

The information relating to at least one service provided by at least one node of the OAM system may comprise information on available service provider instances and respective services supported by each service provider instance.

The method may further comprise facilitating service discovery for management functions coupled to said OAM system. The method may further comprise facilitating discovery of a suitable instance of a management function.

The at least one service and/or said at least one node may be identified based on one or more of:
an identifier associated with an instance of said at least one service and/or said at least one node (e.g. an FQDN and/or an IP address);

a type associated with said at least one service and/or said at least one node;

a PLMN ID associated with said at least one service and/or said at least one node;

an identifier associated with a network slice, a network slice subnet, and/or a network function corresponding to said at least one service and/or said at least one node;

management function specific authorisation information;

a name and/or a type of service;

an endpoint address of an instance of a supported service; and an identifier associated with data/information stored at a data repository for said at least one service and/or said at least one node.

The method may further comprise facilitating exchanging, between nodes coupled to said OAM system, information relating to a particular management function and/or one or more service associated with that management function.

The method may further comprise translating, filtering, and/or authorizing/authenticating information transmitted between nodes within or coupled to said OAM system.

The OAM system may comprise a plurality of distributed service functions and the node may be configured to operate as a centralised service exposure function. For example, the node may comprise at least one of: an OAM registry function; an OAM service exposure function; an OAM service discovery function; and an OAM data repository function.

Various other modifications will be apparent to those skilled in the art and will not be described in further detail here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method performed by a node for an Operations, Administration and Management (OAM) system, the method comprising:

receiving, from at least one management function node of the OAM system, profile information relating to at least one service provided by the at least one management function node of the OAM system for at least one of registering, updating, and deregistering the profile information; and transmitting, to a further management function node included in the OAM system, information of at least one instance of the at least one management function node of the OAM system and one or more of the at least one service which the at least one instance provides, based on the profile information, and wherein the node is included in the OAM system.

2. The method according to claim 1, wherein:

the profile information comprises information indicating a status of the at least one service and/or information indicating at least one instance associated with the at least one service.

3. The method according to claim 1, wherein:

the transmitting of the information to the further management function node is performed upon a request and/or in a case where a predetermined condition is met.

4. The method according to claim 1, further comprising:

storing/retrieving information using a shared or dedicated data repository in the OAM system.

5. The method according to claim 1, wherein:

the profile information comprises information on available service provider instances and respective services supported by each service provider instance.

6. The method according to claim 1, further comprising:

facilitating service discovery for management function nodes of the OAM system.

7. The method according to claim 1, further comprising:

facilitating discovery of a suitable instance of a management function node of the OAM system.

8. The method according to claim 1, wherein:

the at least one service and/or the at least one instance of the at least one management function node is identified based on one or more of:

an identifier associated with one of the at least one instance of the at least one service and/or the at least one management function node;

a type associated with the at least one service and/or the at least one management function node;

a Public Land Mobile Network (PLMN) ID associated with the at least one service and/or the at least one management function node;

an identifier associated with a network slice, a network slice subnet, and/or a network function corresponding to the at least one service and/or the at least one management function node;

management function specific authorisation information;

a name and/or a type of service;

an endpoint address of an instance of a supported service; and an identifier associated with data/information stored at a data repository for the at least one service and/or the at least one management function node.

9. The method according to claim 1, further comprising:

facilitating exchanging, between nodes of the OAM system, information relating to a particular management function and/or one or more service associated with that management function.

10. The method according to claim 1, further comprising:

translating, filtering, and/or authorizing/authenticating information transmitted between nodes of the OAM system.

11. The method according to claim 1, wherein:
the OAM system comprises a plurality of distributed service functions and the at least one management function node is configured to operate as a centralised service exposure function.

12. The method according to claim 1, wherein the node comprises at least one of:
an OAM registry function;
an OAM service exposure function;
an OAM service discovery function; and
an OAM data repository function.

13. The method according to claim 1, wherein
the information is exchanged via a service based architecture.

14. A method performed by a management function node included in an Operations, Administration and Management (OAM) system, the method comprising:
retrieving, from a node of the OAM system via a service based architecture in the OAM system, profile information relating to at least one service provided by at least one further management function node of the OAM system,
wherein the retrieving of the information relating to the at least one service is performed by discovering at least one instance of the at least one further management function node and one or more of the at least one service which is provided by the at least one instance.

15. A node for an Operations, Administration and Management (OAM) system, the node comprising:
a memory storing instructions; and
at least one processor configured to execute the instructions to:
receive, from at least one management function node of the OAM system, a profile information relating to at least one service provided by the at least one management function node of the OAM system for at least one of registering, updating, and deregistering the profile information; and
transmit, to a further management function node included in the OAM system, information of at least one instance of the at least one management function node of the OAM system and one or more of the at least one service which the at least one instance provides, based on the profile information, and
wherein the node is included in the OAM system.

16. The node according to claim 15, wherein
the information is exchanged via a service based architecture.

17. A management function node included in an Operations, Administration and Management (OAM) system, the management function node comprising:
a memory storing instructions, and
at least one processor configured to execute the instructions to:
retrieve, from a node of the OAM system via a service management based architecture, profile information relating to at least one service provided by at least one further management function node of the OAM system, and
wherein the at least one processor is further configured to execute the instructions to perform the retrieval of the profile information by discovering at least one instance of the at least one further management function node and one or more of the at least one service which is provided by the at least one instance.

* * * * *